United States Patent
Suda (10) Patent No.: US 9,895,978 B2
(45) Date of Patent: Feb. 20, 2018

(54) BRAKING FORCE CONTROL METHOD FOR VEHICLE

(71) Applicant: TOYOTA JIDOSHA KABUSHIKI KAISHA, Toyota-shi, Aichi-ken (JP)

(72) Inventor: Rio Suda, Susono (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 15/028,493

(22) PCT Filed: Oct. 30, 2014

(86) PCT No.: PCT/JP2014/079654
§ 371 (c)(1),
(2) Date: Apr. 11, 2016

(87) PCT Pub. No.: WO2015/064771
PCT Pub. Date: May 7, 2015

(65) Prior Publication Data
US 2016/0264002 A1  Sep. 15, 2016

(30) Foreign Application Priority Data
Oct. 30, 2013  (JP) ................................. 2013-225717

(51) Int. Cl.
  *B60B 39/00*  (2006.01)
  *B60L 7/26*  (2006.01)
  (Continued)

(52) U.S. Cl.
  CPC .................................... *B60L 7/26* (2013.01);
    *B60T 1/10* (2013.01); *B60T 8/17616*
    (2013.01); *B60T 2270/602* (2013.01)

(58) Field of Classification Search
  CPC ........ B60L 7/26; B60T 1/10; B60T 2270/602;
    B60T 8/172; B60T 8/1703; B60T
    8/17636; B60T 2210/12; B60T 8/17616
  (Continued)

(56) References Cited

U.S. PATENT DOCUMENTS

2003/0080614 A1* 5/2003 Soga ........................ B60K 6/44
                                                          303/152
2005/0096183 A1* 5/2005 Watanabe .............. B60K 31/04
                                                          477/182
(Continued)

FOREIGN PATENT DOCUMENTS

CN          1413854 A      4/2003
JP       2004-142687 A     5/2004
(Continued)

*Primary Examiner* — Shardul D Patel
(74) *Attorney, Agent, or Firm* — Sughrue Mion, PLLC (57) ABSTRACT

A braking force control method that is applied to a vehicle in which regenerative braking force and friction braking force are applied to the front wheels. When the braking slip quantity of one of the front wheels that is supplied with regenerative braking force exceeds a reference value, with the instance being a reference time point, the friction braking force of the front wheels is controlled so as to increase while the regenerative braking force being controlled so as to be a provisional target regenerative braking force that is lower by a prescribed value than the regenerative braking force of the front wheels at the reference time point. When a decision is made that a prescribed period of time has passed since the reference time point, the regenerative braking force is gradually decreased and the friction braking force is gradually increased.

6 Claims, 4 Drawing Sheets

(51) Int. Cl.
  *B60T 1/10*     (2006.01)
  *B60T 8/1761*   (2006.01)

(58) Field of Classification Search
  USPC ............... 701/70, 71, 78; 303/152; 477/182
  See application file for complete search history.

(56) References Cited

U.S. PATENT DOCUMENTS

| | | | | |
|---|---|---|---|---|
| 2006/0220453 | A1* | 10/2006 | Saito | B60L 7/26 303/152 |
| 2007/0046099 | A1* | 3/2007 | Matsuura | B60K 6/365 303/152 |
| 2013/0060400 | A1* | 3/2013 | Hahne | G08G 1/161 701/1 |
| 2013/0060440 | A1* | 3/2013 | Fukushiro | B60L 11/14 701/70 |
| 2014/0195133 | A1* | 7/2014 | Kato | B60T 1/10 701/78 |

FOREIGN PATENT DOCUMENTS

| | | |
|---|---|---|
| JP | 2010-179742 A | 8/2010 |
| JP | 2013-056587 A | 3/2013 |
| WO | 2013/021272 A2 | 2/2013 |

\* cited by examiner

BRAKING FORCE CONTROL METHOD FOR VEHICLE

CROSS REFERENCE TO RELATED APPLICATIONS

This is a National Stage of International Application No. PCT/JP2014/079654 filed Oct. 30, 2014, claiming priority based on Japanese Patent Application No. 2013-225717 filed Oct. 30, 2013, the contents of all of which are incorporated herein by reference in their entirety.

TECHNICAL FIELD

The present invention relates to a braking force control method for a vehicle in which regenerative braking force and friction braking force are applied to front wheels that are steered wheels.

BACKGROUND ART

In a vehicle in which regenerative braking is conducted, when braking slip of the wheel which is applied with regenerative braking force becomes excessive, so called "braking force replacement" is carried out prior to the braking force control by an anti-skid control (ABS control). That is, regenerative braking force is replaced by friction braking force by decreasing regenerative braking force to 0 and gradually increasing friction braking force. When a condition for initiating the anti-skid control after completion of the braking force replacement, the braking slip of the wheel is alleviated by decreasing and increasing the friction braking force by the anti-skid control in accordance with the braking slip.

In the braking force replacement, in the event where the friction braking force is increased from 0, the friction braking force does not increase at once after a command to increase the friction braking force is outputted, and the increase rate of the friction braking force assumes lower than that of the command. The cause for the above includes a period of time which is required for the pressure in a wheel cylinder to actually increase after the supply of brake fluid to the wheel cylinder is initiated by a brake actuator, a delay in response of the brake actuator, knock back and the like.

If the braking force of the whole of a vehicle is decreased due to the delay in increasing of the friction braking force during the braking force replacement, the deceleration of the vehicle decreases, which may cause the occupants in the vehicle to feel discomfort. In the Japanese Patent Laid-Open Publication No. 2004-142687, for example, as a configuration to cope with the above problem, it is proposed to compensate the insufficient quantity of the braking force due to the delay in increasing of the friction braking force with regenerative braking force. According to the configuration described in the Laid-Open Publication, a risk can be reduced that the braking force of the whole of a vehicle becomes insufficient during the braking force replacement and the deceleration of the vehicle decreases due to the insufficiency.

SUMMARY OF INVENTION

Technical Problem

In the Laid-Open Publication, the braking force replacement is explained to be carried out during the period where vehicle speed is decreasing just before the vehicle stops. However, it may be considered to carry out the braking force replacement described in the Laid-Open Publication in preparation for the braking force control by an anti-skid control.

However, if the above braking force replacement is carried out in preparation for the braking force control by an anti-skid control in a situation where regenerative braking force is applied to front wheels that are steered wheels and the vehicle is turning, as the braking force of the front wheels is not decreased, the vehicle may fall into understeer condition due to short of lateral force of the front wheels. In particular, as the braking slip of the front wheels is higher and as the increase rate thereof is higher, the vehicle is more liable to fall into understeer condition.

It is a principal object of the present invention to reduce a risk that a vehicle falls into understeer condition while reducing a risk that the deceleration of the vehicle so decreases as to cause a discomfort when the braking force replacement is carried out in a situation where regenerative braking force is applied to front wheels.

Solution to Problem

Advantageous Effects of Invention

The present invention provides a braking force control method for a vehicle that is applied to a vehicle in which regenerative braking force and friction braking force are applied to front wheels that are steered wheels; calculates a target braking force of the front wheels; and controls the regenerative braking force and friction braking force on the basis of the target braking force, wherein comprising steps of: when at least one of the braking slip quantities of the front wheels exceeds a reference value in a situation where regenerative braking force is applied to the front wheels, with the instance being a reference time point, controlling the friction braking force of the front wheels so as to increase while controlling the regenerative braking force so as to be a provisional target regenerative braking force that is lower by a prescribed value than the regenerative braking force of the front wheels at the reference time point; and initiating the control for decreasing the regenerative braking force of the front wheels and the control for increasing the friction braking force of the front wheels at the time point when a prescribed period of time has passed from the reference time point so that the regenerative braking force gradually decreases and the friction braking force gradually increases.

According to the above-described configuration, when at least one of the braking slip quantities of the front wheels exceeds a reference value, the regenerative braking force of the front wheels is controlled so as to be a provisional target regenerative braking force that is lower by a prescribed value than the regenerative braking force of the front wheels at that time point (the reference time point), and, in that condition, the friction braking force of the front wheels is controlled so as to increase.

In consequence, just after the reference time point, the regenerative braking force of the front wheels assumes a provisional target regenerative braking force, and the braking force of the front wheels assumes a value that is lower than the target braking force, which enables to restrain the braking slip quantities of the front wheels from increasing. Therefore, even if the vehicle is turning, a risk can be reduced that the vehicle falls into understeer condition due to short of lateral force of the front wheels.

Besides, as the friction braking force increases with delay without fail, the situation where the braking force of the front wheels is lower than the target braking force does not continue for too long. Accordingly, the braking force of the whole of the vehicle is not lowered for too long, which enables to reduce a risk that the occupants in the vehicle feel discomfort due to the decrease in the deceleration of the vehicle.

The delay in increasing of the friction braking force during the braking force replacement decreases as an elapsed time from the reference time point increases. In other words, the responsiveness in increasing of the friction braking force to an increase command increases as the elapsed time from the reference time point increases.

According to the above-described configuration, when a prescribed period of time has passed from the reference time point, the regenerative braking force is gradually decreased and the friction braking force is gradually increased so that the regenerative braking force is gradually replaced with the friction braking force. In consequence, in comparison with the case where the braking force replacement is initiated at the reference time point, the responsiveness in increasing of the friction braking force is enhanced, which enables to reduce the difference between the increase rate in the friction braking force required for the braking force replacement and an actual increase rate in the friction braking force. Therefore, a risk can be reduced that the braking force of the front wheels assumes a value that is lower than the target braking force due to the short in the increase rate of the braking force in the course of the braking force replacement.

The above-mentioned configuration may be such that: the prescribed value is a difference between target braking force at the reference time point and provisional target regenerative braking force for restraining the braking slip quantities of the front wheels from increasing.

According to this configuration, the prescribed value is a difference between target braking force at the reference time point and provisional target regenerative braking force for restraining the braking slip quantities of the front wheels from increasing. Accordingly, by controlling the regenerative braking force of the front wheels so as to be the provisional target regenerative braking force, the braking slip quantities of the front wheels can be restrained from increasing. Therefore, even if the vehicle is turning, a risk can be reduced that the vehicle falls into understeer condition due to short of lateral force of the front wheels.

The above-mentioned configuration may be such that: when a decision is made that a total increased quantity of the friction braking force of the front wheels from the reference time point becomes equal to or larger than the prescribed value, a decision is made that the prescribed period of time has passed from the reference time point.

According to this configuration, when a decision is made that a total increased quantity of the friction braking force of the front wheels from the reference time point becomes equal to or larger than the prescribed value, the braking force replacement, i.e., the gradual decrease in the regenerative braking force and the gradual increase in the friction braking force can be initiated. It is possible to make the difference as small as possible between the increase rate in the friction braking force required for the braking force replacement and an actual increase rate in the friction braking force when the braking force replacement is initiated. By deciding that the prescribed period of time has passed from the reference time point and initiating the braking force replacement when the prescribed period of time has passed from the reference time point, it is possible to avoid the friction braking force from excessively increasing before the braking force replacement is initiated.

The above-mentioned configuration may be such that: the prescribed period of time is a predetermined value.

According to this configuration, it is not necessary to determine the increased amount in the friction braking force of the front wheels after the reference time point and/or to make a decision as to whether or not the increased amount in the friction braking force becomes equal to or larger than the prescribed value. In consequence, in comparison with a case where a decision is made as to whether or not the increased amount in the friction braking force becomes equal to or larger than the prescribed value, the braking force replacement can easily be performed. It is to be noted that the prescribed value may be determined by experiment, for example, so that the delay in increasing the friction braking force is eliminated on or before the braking force replacement is initiated; the increase rate of the friction braking force is made closer to the required increase rate; and the friction braking force is prevented from excessively increasing before the braking force replacement is initiated.

The above-mentioned configuration may be such that: the provisional target braking force is calculated on the basis of the present braking slip quantities of the front wheels so as to be variably set in accordance with the present braking slip quantifies of the front wheels.

According to this configuration, the provisional target braking force can variably be set in accordance with the degree in the change of the braking slip quantities of the front wheels after the reference time point. Accordingly, the provisional target regenerative braking force can variably be set in accordance with the degree in the change of the braking slip quantities of the front wheels after the reference time point. Therefore, in comparison with a case where the provisional target braking force is calculated to be constant, even in the event where the degree in the change of the braking slip quantities of the front wheels after the reference time point changes, the regenerative braking force can appropriately be controlled in accordance with the degree in the change of the braking slip quantities before the braking force replacement is initiated.

The above-mentioned configuration may be such that: the provisional target regenerative braking force is calculated to be a constant value on the basis of the braking slip quantities of the front wheels at the reference time point.

According to this configuration, the provisional target regenerative braking force can be set to be a constant value in accordance with the braking slip quantities of the front wheels at the reference time point. In consequence, in comparison with a case where the provisional target braking force is variably set in accordance with the degree in the change of the braking slip quantities of the front wheels after the reference time point, the control of regenerative braking force before the braking force replacement is initiated can be simplified.

DESCRIPTION OF EMBODIMENTS

A preferred embodiment of the present invention will be described in detail with reference to the accompanying drawings.

Figure 1:
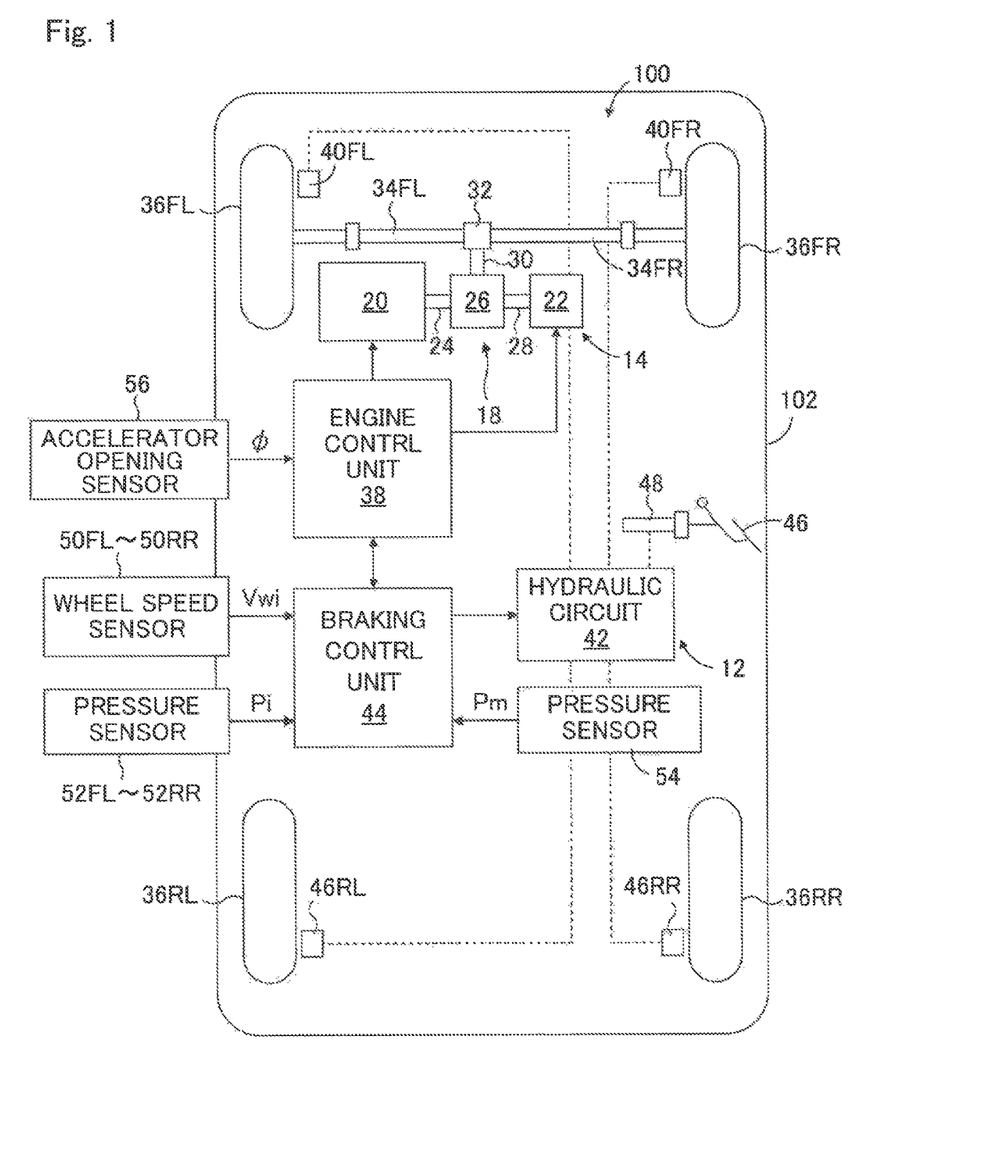
FIG. 1 is a schematic configurational view showing a braking force control device for a vehicle that is applied to a vehicle having a hybrid system installed and executes an embodiment of the braking force control method according to the present invention.

FIG. 1 shows a whole of a braking force control device 100 that is installed in a vehicle 102 and executes an embodiment of the braking force control method according to the present invention. The braking force control device 100 has a hydraulic friction brake device 12 that applies friction braking force to front and rear wheels and a regenerative brake device 14 that applies regenerative braking force to the front wheels. Thus, the braking force of the front wheels is controlled by the cooperative control of friction braking by the friction brake device 12 and regenerative braking by the regenerative brake device 14.

In FIG. 1, 18 denotes a hybrid system that drives the front wheels. The hybrid system 18 includes a gasoline engine 20 and a motor/generator 22. The output shaft of the gasoline engine 20 is coupled with the input shaft of a continuously variable transmission 26 incorporating a clutch. The input shaft of the continuously variable transmission 26 is also coupled with the output shaft 28 of the motor/generator 22. Rotary motion of the output shaft 30 of the continuously variable transmission 26 is transmitted to axles 34FL and 34FR of left and right front wheels 36FL and 36FR by way of a front differential 32 so as to drive to rotate the left and right front wheels.

Driving force generated by the gasoline engine 20 and the motor/generator 22 of the hybrid system 18 is controlled by an engine control unit 38 in accordance with the operating amount of an accelerator pedal (not shown) by a driver and running conditions of the vehicle, for example. The motor/generator 22 also functions as a generator of a regenerative braking device 14 and the function as a generator is also controlled by the engine control unit 38.

As described in detail hereinafter, braking force of the left and right front wheels 36FL and 36FR and the left and right rear wheels 36RL and 36RR is controlled through control of the braking pressures of respective wheel cylinders 40FL, 40FR, 40RL and 40RR by a hydraulic circuit 42. The hydraulic circuit 42 is controlled by a brake control unit 44 in accordance with the braking operating amount of a brake pedal 46 by the driver and functions as a brake actuator. Although not shown in the drawing, the hydraulic circuit 42 includes a reservoir, an oil pump, various valve units, and the like. Brake pressure in each wheel cylinder is controlled by pressure (master cylinder pressure Pm) in a master cylinder 48 driven by the driver's operation of depressing the brake pedal 46 and the like.

The wheels 36FL to 36RR are provided with wheel speed sensors 50FL to 50RR that detect the associated wheel speed Vwi (i=fl, fr, rl and rr) and pressure sensors 52FL to 52RR that detect the associated braking pressures Pi (i=fl, fr, rl and rr). The master cylinder 48 is provided with a pressure sensor 54 detecting the master cylinder pressure Pm. Signals indicative of the values detected the sensors are inputted to the brake control unit 44. The braking pressures Pi of the wheels are utilized in assuming the friction braking force of the respective wheels and controlling the friction braking force of the respective wheels to the associated target values. The braking pressures Pi of the wheels may be estimated on the basis of the operation of the various valve units in the hydraulic circuit 42. It is to be noted that fl, fr, rl and rr represent left front wheel, right front wheel, left rear wheel and right rear wheel.

The brake control unit 44 calculates a target braking force Fvbt of a whole of the vehicle on the basis of the master cylinder pressure Pm that indicates a braking operating amount by the driver. Besides, the brake control unit 44 calculates a target braking force Ffbt of the two front wheels and a target braking force Frbt of the two rear wheels on the basis of the target braking force Fvbt of the whole of the vehicle and distribution ratio of braking force between front and rear wheels so that the sum of the target braking force of the front wheels and the target braking force of the rear wheels conforms to the target braking force Fvbt.

Assume that a maximum value of the regenerative force that can be generated by the regenerative brake device 14 is represented by Ffbmax. In a situation where the target braking force Ffbt of the front wheels is equal to or smaller than the maximum value Ffbmax of the regenerative force, the brake control unit 44 sets a target regenerative braking force Ffbrt of the regenerative brake device 14 to Ffbt and sets a target friction braking force Ffbft of the front wheels to 0. While on the other hand, in a situation where the target braking force Ffbt of the front wheels is larger than the maximum value Ffbmax of the regenerative force, the brake control unit 44 sets a target regenerative braking force Ffbrt of the regenerative brake device 14 to Ffbmax and sets a target friction braking force Ffbft of the front wheels to Ffbt-Ffbmax.

Besides, the brake control unit 44 sets target friction braking force Fflbft and Ffrbft of the left and right front wheels to a half of the target friction braking force Ffbft of the front wheels and sets target friction braking force Frlbft and Frrbft of the left and right rear wheels to a half of the target friction braking force Frbft of the rear wheels. In addition, in the absence of an individual control of braking force as is the case with an anti-skid control and the like that is described later, the brake control unit 44 controls the friction brake device 12 so that the braking force of the left and right front and rear wheels conforms to the associated target friction braking force Fibft (i=fl, fr, rl and rr).

The engine control unit 38 is supplied with a signal indicative of an accelerator opening φ, i.e., depressing amount of an accelerator pedal, not shown, from an accelerator opening sensor 56 and a signal indicative of a gear ratio from the continuously variable transmission 26. Besides, the engine control unit 38 is supplied with a signal indicative of the target friction braking force Ffbft from the brake control unit 44. In a situation where the driving operation by the driver is conducted to drive the vehicle, the engine control unit 38 controls the driving force of the vehicle by controlling the output of the gasoline engine 20 and the motor/generator 22 and the gear ratio of the continuously variable transmission 26 in accordance with the accelerator opening φ.

In contrast, in a situation where the driving operation by the driver is conducted to brake the vehicle, the engine control unit 38 controls the gasoline engine 20 and the motor/generator 22 so that the entire driving force of the vehicle assumes 0. In particular, when receiving a signal indicative of the target regenerative braking force Ffbrt from the brake control unit 44, the engine control unit 38 controls the regenerative braking force on the basis of the target regenerative braking force Ffbrt. That is, the engine control unit 38 controls the regenerative brake device 14 so that the regenerative braking force Ffbr of the regenerative brake device 14 conforms to the target regenerative braking force Ffbrt. Accordingly, the left and right front wheels are supplied with regenerative braking force corresponding to a half of the target regenerative braking force Ffbrt.

It is to be noted that the engine control unit 38 and the braking control unit 44 may have a general configuration or arrangement that includes a microcomputer including CPU, ROM, RAM, input and output devices, and a drive circuit.

The braking control unit 44 estimates a vehicle body speed Vb in a manner known in the art on the basis of the wheel speeds Vwi in accordance with an anti-skid control routine, not shown in the drawing. Besides, the braking control unit 44 calculates a difference between vehicle body speed Vb and the wheel speeds Vwi with respect to the wheels to calculate braking slip quantities SLi (i=fl, fr, rl and rr) as indexes of the degree of braking slip. In addition, the braking control unit 44 determine the necessity of controlling the braking force by the anti-skid control on the basis of the braking slip quantities SLi with respect to the wheels. Incidentally, index of the degree of braking slip may be, for example, a braking slip rate, i.e., a ratio of braking slip quantities SLi relative to vehicle body speed Vb.

In particular, when there is a possibility that braking control by the anti-skid control is initiated in a situation where regenerative braking force is applied to the left and right front wheels 36FL and 36FR, the braking control unit 44 executes the control for replacing regenerative braking force of the front wheels with friction braking force in preparation for the baking force control by the anti-skid control. The braking force replacement control is executed in accordance with the flow chart shown in FIG. 2.

Figure 2:
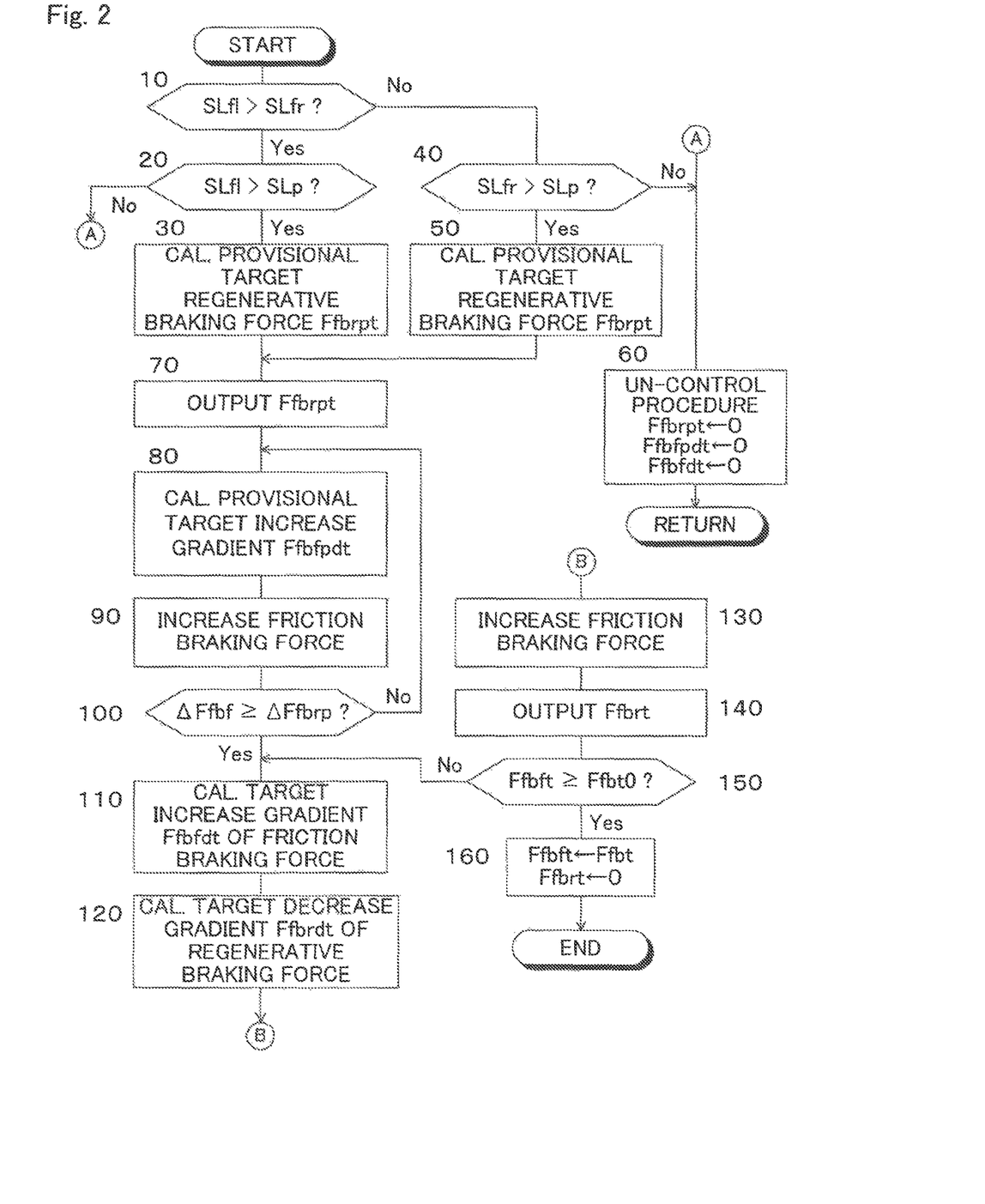
FIG. 2 is a flow chart showing a control routine for replacing the regenerative braking force with the friction braking force in preparation for the braking force control by an anti-skid control in the embodiment.

As described in detail hereinafter, when either of braking slip quantities SLfl and SLfr of the front wheels exceeds a reference value SLp (a positive constant), with the instant being a reference time point, the braking control unit 44 calculates provisional target regenerative braking force Ffbrpt of the front wheels on the basis of the braking slip quantities and the like at the reference time point. Notably, the provisional target regenerative braking force Ffbrpt is a target regenerative braking force corresponding to a provisional target braking force Ffbpt of the front wheels for restraining the increase of braking slip quantities of the front wheels, and is a value smaller by a prescribed value than a target regenerative braking force Ffbrt0 at the reference time point. The prescribed value is a difference between a target braking force Ffbt0 at the reference time point and a provisional target braking force Ffbpt of the front wheels.

Besides, the braking control unit 44 reduces and maintains the regenerative braking force to and at the provisional target regenerative braking force Ffbrpt, and gradually increases the friction braking force of the front wheels. In addition, when an increase amount of the friction braking force after initiation of the braking force replacement control becomes equal to or larger than a prescribed value ΔFfbrp(=Ffbrt0−Ffbrpt), preferably it conforms to a prescribed value ΔFfbrp, the braking control unit 44 gradually reduces the regenerative braking force and gradually increases the friction braking force to a target braking force. Incidentally, the gradual reduction of the regenerative braking force and the gradual increase of the friction braking force are performed so that the sum of the regenerative braking force and the friction braking force conforms to a target braking force of the front wheels at the reference time point.

When either of the braking slip quantities SLfl and SLfr of the front wheels exceeds a reference value SLs (a positive constant that is larger than the reference value SLp) after the regenerative braking force of the front wheels became 0, the braking control unit 44 initiates the individual control of the friction braking force of the wheels by the anti-skid control. Besides, when the braking slip quantity SLfl or SLfr of the wheel becomes equal to or smaller than a termination reference value SLe (a positive constant that is smaller than the reference value SLs), the braking control unit 44 terminates the control of the friction braking force by the anti-skid control.

In contrast, when either of the braking slip quantities SLfl and SLfr of the front wheels exceeds a reference value SLs before the regenerative braking force of the front wheels becomes 0, the braking control unit 44 outputs a signal indicating that a target regenerative braking force Ffbrt is 0 to the engine control unit 38 so that the regenerative braking force of the front wheels becomes 0. Besides, the braking control unit 44 increases the friction braking force of the front wheels by an incremental quantity that corresponds to the decreased amount of the regenerative braking force. In addition, the braking control unit 44 initiates individual control of the friction braking force of the wheels by the and-skid control.

When a predetermined return condition is satisfied after the regenerative braking force of the front wheels became 0, the condition being, for example, the initiation condition of the anti-skid control is not satisfied even a predetermined reference period of time has passed, a braking force replacement is performed in a manner reverse to the aforementioned braking force replacement. That is, regenerative braking force is increased and friction braking force is decreased so as to return the braking force control of the front wheels to the normal control in which regenerative braking force Ffbr is controlled to be a target regenerative braking force Ffbrt and friction braking force of the front wheels is controlled to be a target friction braking force Ffbft.

Notably, as regenerative braking force is not applied to the left and right rear wheels 36RL and 3SRR, when either of the braking slip quantities SLrl and SLrr of the rear wheels exceeds a reference value SLs, the braking control unit 44 initiates the individual control of the friction braking force of the wheel by the anti-skid control. Besides, when the braking slip quantity SLrl or SLrr of the wheel becomes equal to or smaller than a termination reference value SLe, the braking control unit 44 terminates the control of the friction braking force by the anti-skid control.

Next, the routine for achieving braking force replacement control which is performed in preparation for baking force control by anti-skid control in the embodiment will be described with reference to the flow chart shown in FIG. 2. The braking force replacement control according to the flow chart shown in FIG. 2 is performed repeatedly at predetermined time intervals in a situation where regenerative braking force is applied to the left and right front wheels 36FL and 36FR. It is to be noted that in the following descriptions, the control for replacing braking force according to the flow chart shown in FIG. 2 is simply referred to "the control" as necessary.

First, in step 10, with respect to the braking slip quantities SLfl and SLfr of the left and right front wheels 36FL and 36FR calculated in accordance with the anti-skid control routine which is not shown in the figure, a decision is made as to whether or not SLfl is larger than SLfr. If a negative decision is made, the control proceeds to step 40, whereas if an affirmative decision is made, the control proceeds to step 20.

In step 20, a decision is made as to whether or not the braking slip quantity SLfl of the left front wheel 36FL is larger than the reference value SLp, i.e., whether or not the regenerative braking force of the front wheels is to be replaced with friction braking force in preparation for baking force control of the left front wheel by the anti-skid control. If a negative decision is made, the control proceeds to step 60, whereas if an affirmative decision is made, the control proceeds to step 30.

In step 30, provisional target regenerative braking force Ffbrpt corresponding to provisional target braking force Ffbfpt of the front wheels for suppressing the increase of the braking slip quantity SLfl of the left front wheel is calculated according to the following formula (1). It is to be noted that variables in the function fx in the following formula (1) are as follows and Izf is an inertia moment of the front wheels (a known constant). Grounding load Fflz of the left front wheel and estimated friction coefficient μ of a road surface may be values estimated in manners known in the technical field.

$$Ffbrpt=fx(SLfl, SLfld, Ffbr, Fflbf, Izf, Fflz, \mu) \quad (1)$$

SLfld=change rate of the braking slip quantity SLfl of the left front wheel
Ffbr=present regenerative braking force
Fflbf=friction braking force of the left front wheel
Fflz=grounding load of the left front wheel
μ=estimated friction coefficient of a road surface In step 40, a decision is made as to whether or not the braking slip quantity SLfr of the right front wheel 36FR is larger than the reference value SLp, i.e., whether or not the regenerative braking force of the front wheels is to be replaced with friction braking force in preparation for baking force control of the right front wheel by the anti-skid control. If a negative decision is made, the control proceeds to step 60, whereas if an affirmative decision is made, the control proceeds to step 50.

In step 50, provisional target regenerative braking force Ffbrpt corresponding to provisional target braking force Ffbfpt of the front wheels for suppressing the increase of the braking slip quantity SLfr of the right front wheel is calculated according to the following formula (2). It is to be noted that variables in the function fy in the following formula (2) are as follows: Grounding load Ffrz of the right front wheel may be values estimated in manners known in the technical field, and Izf and μ are the same as in the above-mentioned following formula (1).

$$Ffbrpt=fy(SLfr, SLfrd, Ffbr, Ffrbf, Izf, Ffrz, \mu) \quad (2)$$

SLfrd=change rate of the braking slip quantity SLfr of the right front wheel
Ffbr=present regenerative braking force
Ffrbf=friction braking force of the right front wheel
Ffrz=grounding load of the right front wheel
μ=estimated friction coefficient of a road surface In step 60, a un-control procedure is conducted. That is, a procedure is conducted which prevents the braking force replacement control from being executed. Specifically, the provisional target regenerative braking force Ffbrpt, undermentioned provisional target increase gradient Ffbfpdt of the friction braking force and a target increase gradient Ffbfdt of the friction braking force are reset to 0, respectively, and the control returns to step 10.

In step 70, a signal indicative of the provisional target regenerative braking force Ffbrpt is sent to the engine control unit 38, and the regenerative braking device is controlled so that the regenerative braking force Ffbr conforms to the provisional target regenerative braking force Ffbrpt.

In step 80, a provisional target increase gradient Ffbfpdt of the friction braking force of the front wheels which is intended to complete the braking force replacement at the time point when a preset time Ts (a constant such as 1 second or so) has passed since a reference time point is calculated according to the following formula (3). It is to be noted that "reference time point" is a time point when the braking slip quantity SLfl or SLfr has exceeded the reference value SLp, i.e., an affirmative decision was made for the first time in step 20 or 40. In the following formula (3), Ffbrt0 is a target braking force of the front wheels at the reference time point and Tsp is a lapse time from the reference time point.

$$Ffbfpdt=(Ffbt0-Ffbf0)/(Ts-Tsp) \quad (3)$$

In step 90, the friction braking device 12 is controlled so that the friction braking force Ffbf of the front wheels increases by the provisional target increase gradient Ffbfpd. For example, a provisional target friction braking force Ffbfpt is calculated according to the following formula (4) and the friction braking device 12 is controlled so that the friction braking force Ffbf of the front wheels conforms to the provisional target friction braking force Ffbfpt. It is to be noted that in the following formula (4) and in the following formula (7) and (8), Ffbff is the friction braking force Ffbf of the front wheels in the former cycle and ΔT is the cycle time of the flow chart shown in FIG. 2.

$$Ffbfpt=Ffbff+Ffbfpdt*\Delta T \quad (4)$$

In step 100, a difference Ffbrt0−Ffbrpt between the target regenerative braking force Ffbrt0 at the reference time point and the provisional target regenerative braking force Ffbrpt is calculated as a provisional decrease quantity of the regenerative braking force Ffbr, i.e., a prescribed value ΔFfbrp. A difference Ffbf−Ffbf0 between the present friction braking force Ffbf of the front wheels and the friction braking force Ffbf0 of the front wheels at the reference time point is calculated as a total increased quantity ΔFfbf of the friction braking force Ffbf of the front wheels from the reference time point. In addition, a decision is made as to whether or not the total increased quantity ΔFfbf of the friction braking force has become equal to or larger than the prescribed value ΔFfbrp. If a negative decision is made, the control returns to step 80, whereas if an affirmative decision is made, the control proceeds to step 110.

In step 110, a target increase gradient Ffbfdt of the friction braking force of the front wheels which is intended to complete the braking force replacement at the time point when a preset time Ts has passed since the reference time point is calculated according to the following formula (5) which is similar to the above-described formula (3).

$$Ffbfdt=(Ffbt0-Ffbf0)/(Ts-Tsp) \quad (5)$$

In step 120, a target decreasing gradient Ffbrdt of the friction braking force of the front wheels which is intended to complete the braking force replacement at the time point when a preset time Ts has passed since the reference time point is calculated according to the following formula (6).

$$Ffbrdt=-(Ffbrt0-\Delta Ffbrp)/(Ts-Tsp) \quad (6)$$

In step 130, the friction braking device 12 is controlled so that the friction braking force Ffbf of the front wheels increases by the target increase gradient Ffbfdt. For example, a target friction braking force Ffbft is calculated according to the following formula (7) and the friction braking device 12 is controlled so that the friction braking force Ffbf of the front wheels conforms to the target friction braking force Ffbft.

$$Ffbft=Ffbff+Ffbfdt*\Delta T \quad (7)$$

In step 140, a target regenerative braking force Ffbrt of the front wheels is calculated according to the following formula (8). In addition, a signal indicative of the target regenerative braking force Ffbrt is sent to the engine control unit 38, and the regenerative braking device is controlled so that the regenerative braking force Ffbr conforms to the target regenerative braking force Ffbrt. It is to be noted that in the following formula (8), Ffbrf is the regenerative braking force of the front wheels in the former cycle.

$$Ffbrt=Ffbrf+Ffbrdt*\Delta T \quad (8)$$

In step 150, a decision is made as to whether or not the target friction braking force Ffbft of the front wheels calculated in step 130 is equal to or larger than the target friction braking force Ffbt0 of the front wheels at the reference time point, i.e., whether or not the braking force replacement has been completed. If a negative decision is made, the control returns to step 110, whereas if an affirmative decision is made, the control proceeds to step 160.

In step 160, the target friction braking force Ffbft of the front wheels is set to the target braking force Ffbt of the front wheels and the target regenerative braking force Ffbrt is set to 0, which terminates the braking force replacement control by the flow chart shown in FIG. 2. It is to be understood that from this time point, the target friction braking force Ffbft of the front wheels is set to the target braking force Ffbt of the front wheels to which no regenerative braking force is applied, and the target friction braking force Fflbft and Ffrbft of the left and right front wheels is controlled to a half of the target friction braking force Ffbft. Further, the braking force control by the anti-skid control is carried out as necessary. When a predetermined return condition is established, the braking control returns to a normal braking control in which regenerative braking force is applied to the left and right front wheels.

As is apparent from the above descriptions, a preparatory control for replacing regenerative braking force with friction braking force is achieved in step 20 or 40 and in steps 70 to 90. A main control for replacing regenerative braking force with friction braking force is achieved in steps 110 to 160.

As the main control for replacing regenerative braking force with friction braking force is initiated at the time point when a prescribed time has passed from the reference time point, "prescribed time" is the same as the duration of the preparatory control for replacing braking force.

Next, referring to the flow chart shown in FIG. 2 and the time chart shown in FIG. 3, the operation of the embodiment will be described with respect to a situation where only regenerative braking force is applied to the front wheels. In addition, referring to the flow chart shown in FIG. 2 and the time chart shown in FIG. 4, the operation of the embodiment will be described with respect to a situation where friction braking force as well as regenerative braking force is applied to the front wheels.

Figure 3:
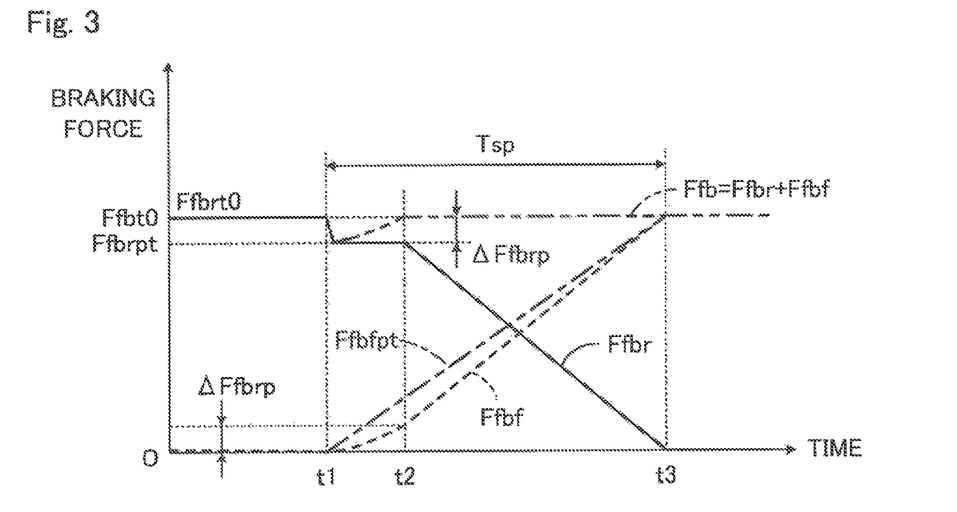
FIG. 3 is a time chart showing changes in regenerative braking force and friction braking force with respect to a case where the braking force replacement is carried out according to the embodiment in a situation where friction braking force is solely applied to the front wheels.
Figure 4:
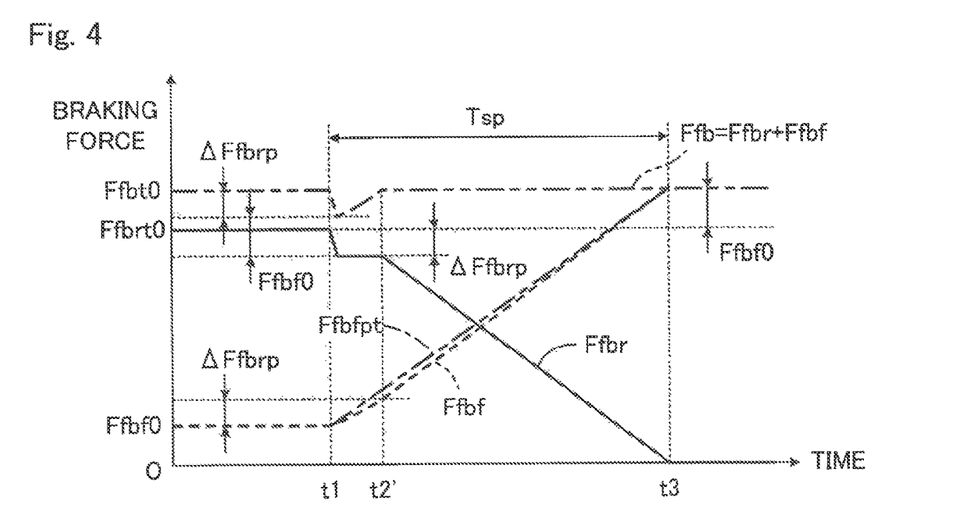
FIG. 4 is a time chart showing changes in regenerative braking force and friction braking force with respect to a case where the braking force replacement is carried out according to the embodiment in a situation where friction braking force as well as regenerative braking force is applied to the front wheels.

It is to be noted that in FIGS. 3 and 4, solid lines indicate regenerative braking force Ffbr of the front wheels and broken lines indicate friction braking force Ffbf of the front wheels. One-dot chain line indicates changes in friction braking force Ffbf of the front wheels caused by provisional target friction braking force Ffbfpt and two-dot chain line indicates the braking force Ffb of the front wheels, i.e., the sum of the regenerative braking force Ffbr and the friction braking force Ffbf of the front wheels. The same goes with FIG. 5 which shows the time chart similar to FIG. 3 with respect to a conventional braking force control.

In general, the braking force replacement control in preparation for baking force control by anti-skid control is performed when the braking operation of a driver is increased and target braking force Ffbt of the front wheels accordingly increases. However, the time Ts from the reference time point to a time point when the braking force replacement has been completed is very short such as one second or so as described above. Consequently, as target braking force Ffbt of the front wheels may be deemed constant in the description of the operation of the embodiment, the target braking force is shown as constant in FIGS. 3 to 5.

A Situation where Only Regenerative Braking Force is Applied to the Front Wheels:

First, when the larger one of braking slip quantities SLfl and SLfr of the left and right front wheels exceeds the reference value SLp, an affirmative decision is made in step 20 or 40 and the preparatory control for replacing braking force of the front wheels is initiated. The time point when the preparatory control for replacing braking force is initiated, i.e., the reference time point is time point in the time chart shown in FIG. 3. In step 30 or 50, provisional target regenerative braking force Ffbrpt for restraining the increase of the braking slip quantity of the front wheels is calculated on the basis of the larger one of braking slip quantities SLfl and SLfr of the left and right front wheels and the like. In step 70, the regenerative brake device 14 is controlled so that the regenerative braking force Ffbr of the front wheels conforms to the provisional target regenerative braking force Ffbrpt.

After the reference time point t1, steps 80 and 90 are repeatedly achieved in the condition where regenerative braking force Ffbr is controlled so as to be the provisional target regenerative braking force Ffbrpt, whereby the friction brake device 12 is controlled so that the friction braking force Ffbf of the front wheels increases at a provisional target increase rate Ffbpdt. Incidentally, the provisional target increase rate Ffbpdt is a target increase rate of the friction braking force of the front wheels which is required to complete the braking force replacement at a time point when a predetermined period of time Ts has passed from the reference time point. However, as is understood from the comparison in inclination of the one dot chain line and the broken line shown in FIG. 3, an actual increase rate by which the friction braking force is increased from 0 is smaller than the provisional target increase rate Ffbpdt due to the delay of the rise of the pressure in the wheel cylinders and the like.

When the friction braking force Ffbf of the front wheels increases and a total increased quantity ΔFfbf(=Ffbf−Ffbf0) of the friction braking force Ffbf of the front wheels from the reference time point t1 is equal to or larger than a prescribed value ΔFfbrp (=Ffbrt0 −Ffbrpt), an affirmative decision is made in step 100. The time point when the affirmative decision is made is assumed to be t2, the preparatory control for replacing braking force is completed on or after the time point t2. After the time point t2, step 100 and steps 140 to 160 are repeatedly conducted to thereby achieve the main control for replacing braking force, i.e., substantial braking force replacement.

In particular, in step 110, a target increase gradient Ffbfdt of the friction braking force of the front wheels is calculated which is intended to complete the braking force replacement at the time point when a preset time Ts has passed since the reference time point. In step 120, a target decreasing gradient Ffbrdt of the friction braking force of the front wheels is calculated which is intended to complete the braking force replacement at the time point when a preset time Ts has passed since the reference time point. Besides, in steps 130 and 140, the friction braking force Ffbf of the front wheels is gradually increased by the target increase gradient Ffbfdt and the regenerative braking force Ffbr is gradually decreased by the target decreasing gradient Ffbrdt.

When the friction braking force Ffbf of the front wheels becomes equal to or larger than the target friction braking force Ffbt0 of the front wheels at the reference time point, an affirmative decision is made in step 150. The time point when the affirmative decision is made is assumed to be t3, step 160 is conducted at the time point t3 so as to complete the braking force replacement. Accordingly, after the time point t3, friction braking force is solely applied to the front wheels.

Thus, according to the embodiment, as shown by the two dot chain line in FIG. 3, just after initiating the preparatory control for replacing braking force, the braking force Ffb (=Ffbr+Ffbf) of the front wheels becomes smaller than the target friction braking force Ffbt0 of the front wheels at the reference time point. However, the braking force Ffb of the front wheels gradually increases until the time point t2 and after the time point t2, the main control for replacing braking force is executed. In consequence, the braking force of the front wheels can temporarily be reduced prior to a substantial braking force replacement and the slip quantities of the front wheels can be restrained from increasing, which enables to reduce a risk that the vehicle falls into the understeer condition even the vehicle is turning. Besides, the braking force of the front wheels can be prevented from being lower than the target braking force Ffbt for a long period of time, which enables to reduce a possibility that the occupants in the vehicle feel discomfort due to the decrease in the deceleration of the vehicle.

Figure 5:
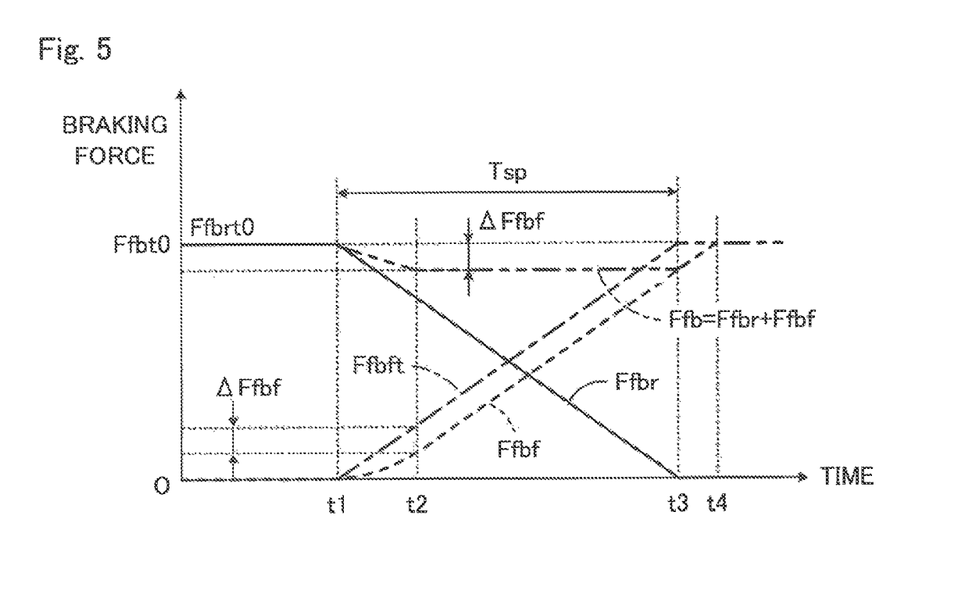
FIG. 5 is a time chart illustrating the changes in regenerative braking force and friction braking force with respect to a case where braking force replacement is executed according to a prior art in which braking force is not supplemented with regenerative braking force in a situation where regenerative braking force is solely applied to the front wheels.

FIG. 5 is a time chart illustrating the changes in regenerative braking force and friction braking force with respect to a case where braking force replacement is executed according to a prior art in which braking force is not supplemented with regenerative braking force in a situation where regenerative braking force is solely applied to the front wheels. In the illustrated prior art, assuming that a condition for initiating braking force replacement is satisfied at the time point t1, the reduction in regenerative braking force and the increase in friction braking force are initiated at t the time point t1.

As shown by the broken line in FIG. 5, however, the increase rate by which the friction braking force Ffbf of the front wheels is increased from 0 is smaller than that of the target friction braking force Ffbft shown by one dot chain line in FIG. 5. Assuming that at the time point t2, the friction braking force Ffbf of the front wheels becomes to increase by an original increase rate by which the target friction braking force Ffbft increases, the friction braking force Ffbf of the front wheels after the time point t2 is smaller than the target friction braking force Ffbft by Δ Ffbf(=Ffbft−Ffbf).

As a result, the friction braking force Ffbf of the front wheels assumes a value smaller than the target friction braking force Ffbft by Δ Ffbf for a long period of time from the time point t2 until the time point t3 when the braking force replacement is to be completed. If the braking operation amount is increased by a driver to cope with the decrease in the braking force of the whole of the vehicle, the braking force is increased, which may cause the possibility to be increased that a condition for initiating the anti-skid control is satisfied earlier and the vehicle falls into understeer condition during turning.

In contrast, according to the embodiment as described above, on and after the time point t2, the braking force Ffb of the front wheels assumes a value that is equal to the target braking force Ffbt0 of the front wheels at the time point t1, which enables to reduce the possibility that the braking operation amount is increased by the driver in comparison with the prior art. In consequence, a risk can be reduced that the condition for initiating the anti-skid control is satisfied earlier and/or the vehicle falls into an understeer condition due to the increase in the braking force by the driver.

If the condition for initiating the anti-skid control is satisfied before the braking force replacement has been completed, the regenerative braking force must rapidly be reduced to 0 and the friction braking force must rapidly be increased to the target braking force of the front wheels. In the case of prior art, however, as shown in FIG. 5, the braking force replacement has not been completed until the time point t4 which is later than the time point t3 when the braking force replacement is to be completed. For that reason, if the condition for initiating the anti-skid control is satisfied before the braking force replacement has been completed, the decrease quantity that is required to reduce the regenerative braking force to 0 and the increase quantity that is required to increase the friction braking force to the target braking force of the front wheels become large in magnitude. In consequence, a risk increases that the braking force of the whole of the vehicle change unnaturally just before the braking force control by the anti-skid control is initiated and, due to this, the deceleration of the vehicle changes unnaturally.

In contrast, according to the embodiment, as described above, the braking force replacement is completed at the time point t3. In consequence, even if the condition for initiating the anti-skid control is satisfied before the braking force replacement has been completed, the decrease quantity that is required to reduce the regenerative braking force to 0 and the increase quantity that is required to increase the friction braking force to the target braking force of the front wheels do not become so large in magnitude as in the prior art. Therefore, the risk can be reduced that the braking force of the whole of the vehicle change unnaturally just before the braking force control by the anti-skid control is initiated and, due to this, the deceleration of the vehicle changes unnaturally.

Figure 6:
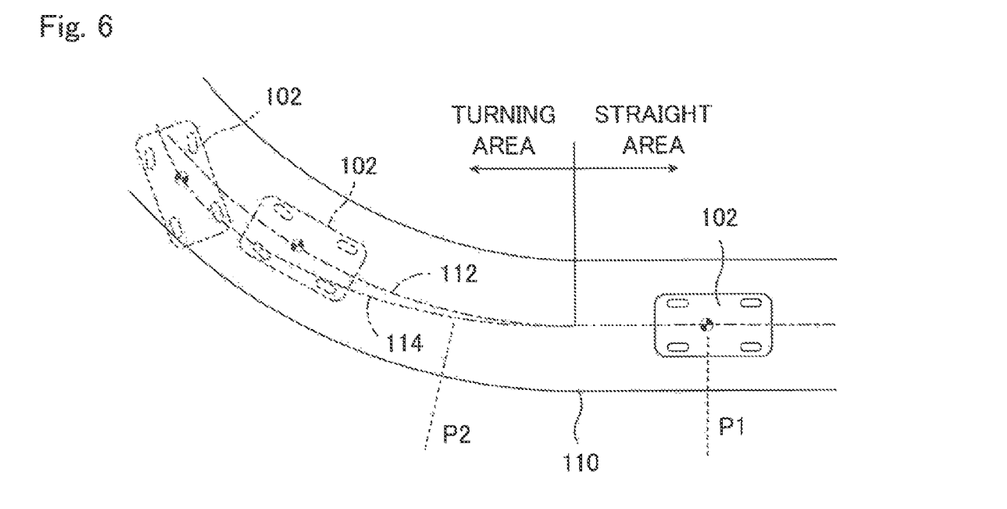
FIG. 6 is an explanatory drawing illustrating the running behavior of a vehicle when the running condition of the vehicle changes from straight running to turning conditions while being decelerated by braking with respect to the embodiment and the braking force control device described in the aforementioned Japanese Patent Laid-Open Publication.

FIG. 6 is an explanatory drawing illustrating the running behavior of a vehicle when the running condition of the vehicle changes from straight running to turning conditions while being decelerated by braking with respect to the embodiment and the braking force control device described in the aforementioned Japanese Patent Laid-Open Publication. It is to be noted that in FIG. 6, 110 indicates a travelling path that changes from a straight area to a turning area as a vehicle 102 runs and a one-dot chain line 112 indicates a preferable travelling trajectory of the vehicle 102 along the travelling path 110.

Assume that braking is initiated at a point P1 that is closed to the end of the straight area of the travelling path 110; the vehicle 102 runs while being decelerated in the turn area of the travelling path 110; and the larger one of braking slip quantities SLfl and SLfr of the left and right front wheels exceeds the reference value SLp at a point P2.

In the case of the braking force control device described in the aforementioned Japanese Patent Laid-Open Publication, even after the larger one of braking slip quantities SLfl and SLfr of the left and right front wheels exceeds the reference value SLp at the point P2, the friction braking force of the front wheels is controlled to a target braking force and is not lowered. Accordingly, in a situation where the vehicle runs in the turn area of the travelling path 110, the vehicle tends to fall into an understeer condition due to insufficiency in lateral force of the front wheels.

It is to be noted that in the case of the braking force control device in which braking force is not supplemented with regenerative braking force, the braking force replacement is initiated at the point P2 and the braking force of the whole of the vehicle decreases. If the driver feels insufficiency in deceleration of the vehicle and excessively increases the braking operation amount, the braking slip quantities of the front wheels accordingly increase. As a result, as shown by a two-dot chain line 114 in FIG. 6, the vehicle exhibits an understeer behavior and the anti-skid control is initiated earlier.

In contrast, according to the embodiment, just after the vehicle passes the point P2, the braking force of the front wheels is lowered to a value that restrains the braking force of the front wheels from increasing and thereafter, is increased so as to conform to a target the braking force of the front wheels. In consequence, as the braking slip quantities of the front wheels are restrained from increasing and a risk is low that the driver excessively increases the braking operation amount, a risk is also low that the vehicle exhibits an understeer behavior and/or the anti-skid control is initiated earlier.

A Situation where Friction Braking Force as well as Regenerative Braking Force is Applied to the Front Wheels:

In a situation where friction braking force as well as regenerative braking force is applied to the front wheels, the steps in the flow chart shown in FIG. 2 are achieved in the same manner as in the situation where regenerative braking force is solely applied to the front wheels. However, in the situation where friction braking force as well as regenerative braking force is applied to the front wheels, the pressure in each wheel cylinder has already increased enough to effectively generate braking force. Accordingly, an actual increase rate by which friction braking force is increased in this situation is larger than that in a situation where friction braking force is increased from 0.

In consequence, a total increased quantity $\Delta Ffbf(=Ffbf-Ffbf0)$ of the friction braking force Ffbf of the front wheels after the initiation of the braking force replacement assumes a prescribed value $\Delta Ffbrp$ ($-Ffbrt0-Ffbrpt$) or more earlier than in the case where regenerative braking force is solely applied to the front wheels. As a result, a time point t2' when the decision in step 100 changes to affirmative is closer to the time point t1 in comparison with the time point t2 when the decision in step 100 changes to affirmative in the case where regenerative braking force is solely applied to the front wheels. After the time point t2', the braking force Ffb of the front wheels assumes the same as the target braking force Ffbt0 of the front wheels.

Thus, as compared to where the regenerative braking force is solely applied to the front wheels, the period of time can be shortened where the braking force Ffb of the front wheels assumes a value lower than the target braking force Ffbt0. Consequently, as compared to where the regenerative braking force is solely applied to the front wheels, the main control for replacing braking force can be initiated earlier and a risk can be reduced that the braking operation amount is increased by the driver.

Besides, a difference at the time point t2' between the provisional target friction braking force Ffbfpt of the front wheels and the actual friction braking force Ffbf assumes a smaller value as compared to where the regenerative braking force is solely applied to the front wheels. Accordingly, the increase rate of the actual friction braking force Ffbf from the time point t2' to the time point t3 assumes a value close to the increase rate of the provisional target friction braking force Ffbfpt. Therefore, as compared to where the regenerative braking force is solely applied to the front wheels, the increase rate of the actual friction braking force and the decrease rate of the regenerative friction braking force of the front wheels can be reduced in magnitude.

In a situation where friction braking force as well as regenerative braking force is applied to the front wheels, the braking force replacement is completed at the time point t3 when it is to be completed. In consequence, in comparison with a prior art where compensation with regenerative braking force is not conducted, a risk can be reduced that the braking force of the whole of the vehicle change unnaturally and, due to this, the deceleration of the vehicle changes unnaturally in a situation where the braking force control by the anti-skid control is initiated before the time point t3.

It is to be noted that in the event where no regenerative braking force is applied to the front wheels due to an abnormality of the regenerative braking device 14 and the like, the braking force replacement is not required, and accordingly, the braking force replacement in accordance with the flow chart shown in FIG. 2 is not executed.

In particular, according to the embodiment, a target increase rate Ffbfdt of friction braking force of the front wheels and a target increase rate Ffbrdt of regenerative friction braking force of the front wheels are calculated so that the braking force replacement is completed at the time point when the period of time Ts passes from the reference time point. In consequence, irrespective of the length of the period of time from the reference time point (the time point t1) to the time point (the time point t2) when a total increased quantity $\Delta Ffbf$ of the friction braking force is decided to assume a prescribed value $\Delta Ffbrp$ or more, the braking force replacement can be completed at the time point when the period of time Ts passes from the reference time point.

While the present invention has been described with reference to the above embodiment, it will be apparent to those skilled in the art that the present invention is not limited thereto, but may be embodied in various other forms without departing from the scope of the invention.

For example, in the above-described embodiment, as the control for replacing braking force in accordance with the flow chart shown in FIG. 2 is executed as long as regenerative braking force is applied to the front wheels, the control is also executed in a situation where friction braking force as well as regenerative braking force is applied to the front wheels. However, the control for replacing braking force in accordance with the flow chart shown in FIG. 2 may be modified so that it is executed in a situation where regenerative braking force is solely applied to the front wheels.

In the above modification, the provisional target regenerative braking force Ffbrpt is calculated as a provisional target regenerative braking force for restraining the braking slip quantities of the front wheels from increasing according to the following formulae (1') and (2') that correspond to the aforementioned formulae (1) and (2), respectively, The formulae (1') and (2'), as is understood by comparing them with the formulae (1) and (2), respectively, do not contain friction braking force Fflbf and Ffrbf as variables.

$$Ffbrpt=fx(SLfl, SLfld, Ffbr, Izf, Fflz, \mu) \quad (1')$$

$$Ffbrpt=fy(SLfr, SLfrd, Ffbr, Izf, Ffrz, \mu) \quad (2')$$

In the above-described embodiment, the provisional target regenerative braking force Ffbrpt is calculated according to the aforementioned formula (1) or (2). However, the provisional target regenerative braking force Ffbrpt is calculated as a provisional target regenerative braking force that corresponds to a provisional target braking force Ffbpt for restraining the braking slip quantities of the front wheels from increasing, it may be calculated according to a formula other than the aforementioned formula (1) or (2). For example, the provisional target regenerative braking force Ffbrpt may be calculated by calculating a provisional target braking force Ffbpt for restraining the braking slip quantities of the front wheels from increasing and subtracting friction braking force Ffbf of the front wheels from the provisional target braking force Ffbpt.

As described above, an increase rate in the preparatory control by which friction braking force is increased in a situation where friction braking force as well as regenerative braking force is applied to the front wheels is larger than that in a situation where regenerative braking force is solely applied to the front wheels. In consequence, the provisional target regenerative braking force Ffbrpt in a situation where regenerative braking force is solely applied to the front wheels may be set to a value that is higher than the provisional target regenerative braking force which is set when friction braking force is increased in a situation where friction braking force as well as regenerative braking force is applied to the front wheels.

Besides, the provisional target regenerative braking force Ffbrpt is set to a value that is smaller by a prescribed value $\Delta Ffbrp$ than regenerative braking force Ffbr0 at the reference time point, and the prescribed value $\Delta Ffbrp$ is variably set in accordance with the slip quantities of the front wheels and the like. However, the prescribed value $\Delta Ffbrp$ may be a predetermined constant. In the modification, the prescribed value $\Delta Ffbrp$ utilized in a situation where friction braking force as well as regenerative braking force is applied to the front wheels may be set to a value that is smaller than that utilized in a situation where regenerative braking force is solely applied to the front wheels, In the above-described embodiment, when a total increased quantity $\Delta Ffbf$ of the friction braking force. Ffbf of the front wheels from the reference time point becomes equal to or larger than the prescribed value $\Delta Ffbrp$, a decision is made that the prescribed period of time has passed, and the main control for braking force replacement is initiated. However, the prescribed period of time (duration time of the preparatory control for braking force replacement) may be set to a constant value that is determined as a time in which a total increased quantity $\Delta Ffbf$ becomes the prescribed value $\Delta Ffbrp$ on the basis of experiment and the like. In the modification, the prescribed period of time utilized in a situation where friction braking force as well as regenerative braking force is applied to the front wheels may be set to a value that is shorter than that utilized in a situation where regenerative braking force is solely applied to the front wheels.

In the above-described embodiment, the time Ts is preset as a period of time from a reference time point to a time point when the braking force replacement has been completed. However, the time Ts may be preset to a period of time from the time point when an affirmative decision is made in step 100 to a time point when the braking force replacement has been completed, i.e., the duration time of the main control.

In the above-described embodiment, when an affirmative decision is made in step 100, in step 110, a target increase gradient Ffbfdt of the friction braking force of the front wheels and a target increase gradient Ffbrdt of the regenerative braking force are calculated so that the braking force replacement is completed at the time point when a preset time Ts has passed since the reference time point is calculated. However, a target increase gradient Ffbfdt of the friction braking force of the front wheels and a target increase gradient Ffbrdt of the regenerative braking force may be preset values or may be variably set in accordance with the regenerative braking force Ffbr at the reference time point.

Besides, a target increase gradient Ffbfdt of the friction braking force of the front wheels and a target increase gradient Ffbrdt of the regenerative braking force may be calculated on the basis of the friction braking force of the front wheels and the regenerative braking force at the time point (time point t2) when a prescribed period of time has passed from the reference time point. In addition, a target increase gradient Ffbfdt of the friction braking force of the front wheels and a target increase gradient Ffbrdt of the regenerative braking force may successively be renewed by calculating them on the basis of the present friction braking force of the front wheels and the present regenerative braking force after the time point when a prescribed period of time has passed from the reference time point.

While in the above-described embodiment, the provisional target regenerative braking force Ffbrpt is constant until an affirmative decision is made in step 100, it may variably be set in accordance with the target braking force Ffbt of the front wheels.

In the above-described embodiment, the motor/generator 22 of the hybrid system 18 functions as a regenerative generator of the regenerative brake device 14. However, so long as the regenerative brake device 14 applies regenerative braking force to the front wheels, it may have any structure.

The invention claimed is:

1. A braking force control method for a vehicle that is applied to a vehicle in which regenerative braking force and friction braking force are applied to front wheels that are steered wheels; calculates a target braking force of the front wheels; and controls the regenerative braking force and friction braking force on the basis of said target braking force, wherein comprising steps of:

when at least one of the braking slip quantities of the front wheels exceeds a reference value in a situation where regenerative braking force is applied to the front wheels, with the instance being a reference time point, during a period that is after said reference time point and before a presciibed period of time has passed from said reference time point, controlling the friction braking force of the front wheels so as to gradually increase while controlling the regenerative braking force so as to be a provisional target regenerative braking force that is lower by a prescribed value than the regenerative braking force of the front wheels at said reference time point so that the braking force of the front wheel becomes a value lower than the target braking force of the front wheels; and executing the control for decreasing the regenerative braking force of the front wheels and the control for increasing the friction braking force of the front wheels at the time point after said prescribed period of time has passed from said reference time point so as to gradually decrease the regenerative braking force and to gradually increase the friction braking force so that the braking force of the front wheels conforms to the target braking force of the front wheels.

2. The braking force control method for a vehicle according to claim 1, wherein said prescribed value is a difference between target braking force at the reference time point and provisional target regenerative braking force for restraining the braking slip quantities of the front wheels from increasing.

3. The braking force control method for a vehicle according to claim 1, wherein when a decision is made that a total increased quantity of the friction braking force of the front wheels from said reference time point becomes equal to or larger than said prescribed value, a decision is made that said prescribed period of time has passed from said reference time point.

4. The braking force control method for a vehicle according to claim 1, wherein said prescribed period of time is a predetermined value.

5. The braking force control method for a vehicle according to claim 2, wherein said provisional target braking force is calculated on the basis of the present braking slip quantities of the front wheels so as to be variably set in accordance with the present braking slip quantities of the front wheels.

6. The braking force control method for a vehicle according to claim 2, wherein said provisional target regenerative braking force is calculated to be a constant value on the basis of the braking slip quantities of the front wheels at said reference time point.

\* \* \* \* \*